S. C. SCHAUER & P. L. BROCKARDT.
GEARING.
APPLICATION FILED MAR. 6, 1908.
978,221.
Patented Dec. 13, 1910.
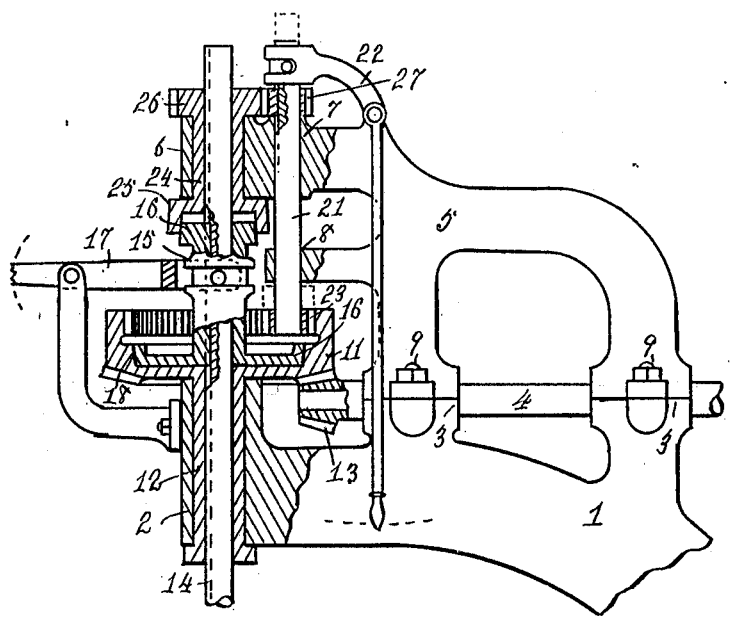
Witnesses,
Samuel S. Carr,
Phebe A. Carr.
Inventors,
Sherman C. Schauer, and
Paul L. Brockardt,
By Robert S. Carr, Atty.

UNITED STATES PATENT OFFICE.

SHERMAN C. SCHAUER, OF CINCINNATI, AND PAUL L. BROCKARDT, OF HAMILTON, OHIO, ASSIGNORS, BY MESNE ASSIGNMENTS, TO THE CINCINNATI BICKFORD TOOL COMPANY, OF CINCINNATI, OHIO, A CORPORATION OF OHIO.

GEARING.

978,221.  Specification of Letters Patent.  Patented Dec. 13, 1910.

Application filed March 6, 1908. Serial No. 419,464.

*To all whom it may concern:*

Be it known that we, SHERMAN C. SCHAUER, of Cincinnati, Ohio, and PAUL L. BROCKARDT, of Hamilton, Ohio, both citizens of the United States, have invented a new and useful Improvement in Gearing, of which the following is a specification.

Our invention relates to gearing and the objects of our improvement are to provide means for rotating the spindle at greater speed in a rearward than in a forward direction from a constantly driven shaft to facilitate its use for tapping or other purposes; to provide means for disengaging the reversing mechanism, and to provide simple and durable construction and assemblage of parts for obtaining facility of operation and efficiency of action. These objects are attained in the following described manner, as illustrated in the accompanying drawings, in which:—the figure is a side elevation with parts in section, of parts of a drill press embodying our improvements.

In the drawings, 1 represents the top yoke of an upright drill press formed with a vertical bearing 2 and with horizontal bearings 3 for the driving shaft 4. A bracket 5 formed with vertical bearings 6, 7 and 8 is removably secured on the top yoke by means of cap screws 9. A combined internal and bevel gear 11 formed with a hollow sleeve or hub 12 is thereby journaled in bearing 2 and driven from shaft 4 by means of bevel pinion 13 thereon.

The spindle 14 is rotatively and longitudinally movable in the hub 12 of gear 11 and a sleeve 15 splined thereon is formed with clutch members 16 on its respective ends and movable longitudinally by means of hand lever 17 in the usual manner. One of said clutch members is adapted to detachably engage with a clutch member 18 formed on gear 11 on the internal gear end thereof for driving said sleeve with the spindle in a forward direction. A short shaft 21 journaled in bearings 7 and 8 is longitudinally movable therein by means of a hand lever 22 in the usual manner. Said shaft is provided with a spur pinion 23 in detachable engagement with the internal portion of gear 11. A sleeve 24 through which the spindle is movable is journaled in bearing 6 and provided with a clutch member 25 adapted to detachably engage with the top clutch member 16 on sleeve 15. Said sleeve is also provided with a spur gear 26 adapted to detachably engage with the spur pinion 27 which is splined on shaft 21.

The internal gear rotates shaft 21 in the same direction and the spur pinion 27 thereon rotates the sleeve 24 with the clutch member 25 in the opposite direction and at an increased speed. By the alternate engagement of the sleeve 15 with gear 11 and sleeve 24 the spindle may be thereby rotated in respective opposite directions.

The longitudinal movement of shaft 21 in an upward direction lifts pinion 23 out of engagement with the internal gear and discontinues the action of sleeve 24.

Having fully described our improvement what we claim as our invention and desire to secure by Letters Patent of the United States is:—

1. The combination with a spindle, an internal and a spur gear concentric therewith, and means for detachably engaging the spindle with either of said gears, of a shaft journaled in fixed bearings, pinions thereon engaging with the respective gears and means for moving said shaft longitudinally with one of said pinions out of engagement with the corresponding gear.

2. A gearing comprising oppositely disposed rotative members, the one being provided with an internal gear, and the other with a spur gear, and a shaft provided with pinions in engagement with the respective gears, and means for disengaging one of the pinions.

3. The combination with a spindle, an internal and a spur gear concentric therewith, and means for detachably engaging the spindle with either of said gears, of a shaft journaled parallel with the spindle, a pinion splined thereon and in continuous engagement with one of said gears, a pinion secured on said shaft and detachably engaging with the other said gear, and means for moving the shaft longitudinally with the latter pinion out of engagement with the corresponding gear.

SHERMAN C. SCHAUER.
P. L. BROCKARDT.

Witnesses:
ED F. ALEXANDER,
F. S. BALDWIN.